Oct. 15, 1929.  J. C. GROBLE ET AL  1,731,773
PRESSURE REGULATOR
Filed Jan. 3, 1928
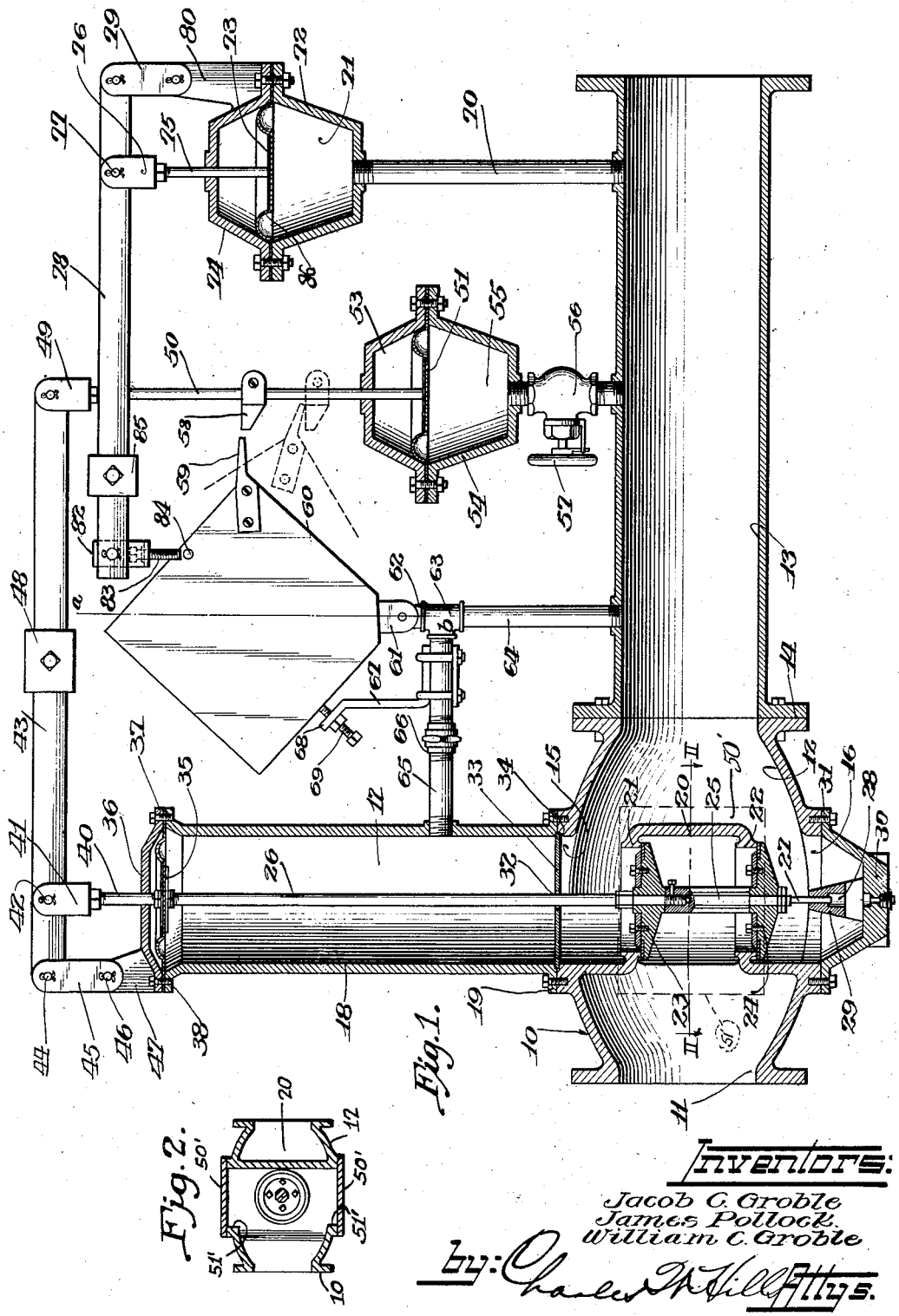
Inventors:
Jacob C. Groble
James Pollock
William C. Groble
by: Charles W. Hill Attys.

Patented Oct. 15, 1929

1,731,773

UNITED STATES PATENT OFFICE

JACOB C. GROBLE, JAMES POLLOCK, AND WILLIAM C. GROBLE, OF ANDERSON, INDIANA, ASSIGNORS TO GROBLE GAS REGULATOR CO., OF ANDERSON, INDIANA, A CORPORATION OF INDIANA

PRESSURE REGULATOR

Application filed January 3, 1928. Serial No. 244,080.

Our invention relates in general to pressure regulators, and more particularly to improvements in fluid pressure regulators adapted for use as district station governors in gas mains and the like.

An object of the present invention is the provision of an improved pressure regulator adapted to maintain a pressure in a fluid supply line sufficient to produce a substantially constant pressure at all of the consuming stations independent of the demand of each, or the total demand at any given time.

Another object of this invention resides in the provision of means for controlling a fluid pressure regulator from the low pressure side without the use of an auxiliary high pressure regulator.

Still another object of the invention is the provision of controlling means for a pressure regulator adapted to permit of an increased pressure in the low pressure main during the hours of high consumption.

A further object of our invention has to do with the provision of a fluid pressure regulator adapted to restrict the flow of fluid from a source of fluid of relatively high pressure to a low pressure distributing main to maintain a relatively constant pressure upon the distributing main until a predetermined flow is reached, and adapted when there is a sudden increase in the demand to quickly increase the flow between the source and the distributing main so as to immediately take care of the heavy demand.

A still further object of this invention is the provision of an improved pressure regulator and novel weight means for controlling the operation of the regulator.

Another and still further object of the invention resides in the provision of a fluid pressure control system including a pressure regulator adapted to maintain a substantially constant flow of fluid in a distributing main, and weight means controlled by the flow in the distributing main for automatically increasing the fluid supply to the distributing main whenever there is a sudden increase in the demand for fluid.

In accordance with the general features of the invention, we provide a fluid pressure control system including a main control valve, means including a diaphragm for normally controlling the valve to cause a relatively constant pressure to be maintained in the distributing main, auxiliary control means including a diaphragm connected to the low pressure distributing main and responsive to the flow of fluid therin, and weight means controlled by said auxiliary means adapted to act on said first mentioned means to increase the opening of said valve when a sudden increase in the demand for fluid occurs.

Another feature of the invention resides in the provision of a pivoted weight construction adapted to be utilized in the control of a fluid pressure regulator, and adapted to be brought into play whenever the pressure in the distributing main drops below a given amount.

Still another feature of the invention is the provision of a pressure regulator including a reducing valve, a control weight normally maintained with its axis positioned to one side of a given center line, and means adapted when a predetermined pressure has been reached in a low pressure main to cause the weight to be moved to the other side of the center line so as to cause it to become effective in increasing the range of operation of the reducing valve.

Other objects and advantages of our invention will more fully appear from the following detailed description taken in connection with the accompanying drawing, in which Figure 1 is a central sectional view, partly in elevation, of a pressure regulator and control means therefor embodying the features of this invention and Figure 2 is a sectional view taken on the line II—II of Figure 1 looking downwardly and drawn to a reduced scale.

In the drawings:

The reference character 10 designates generally a reducing valve body which includes an inlet 11 for high pressure fluid and an outlet 12 for low pressure fluid disposed in communication with a low pressure main 13 connected at 14 to the body 10 of the reducing valve. The inlet 11 may be connected to any suitable high pressure main of conventional construction. The body 10 has formed in it diametrically opposed vertical openings 15 and 16. The upper opening 15 is aligned with an opening or pressure chamber 17 of a vertical tubular extension 18. The lower end of the vertical tubular extension 18 is secured at 19 to the top of the valve body 10.

Disposed within and formed integral with the valve body 10 is a partition wall 20 which has formed integral with it a pair of aligned valve seats 21 and 22. The upper valve seat 21 is cooperable with a valve member 23, and the lower valve seat is cooperable with a valve member 24. These valve members are connected together by a polygonal-shaped rod 25. The upper valve member 23 is connected to a vertical stem 26 extending upwardly through the pressure chamber 17. The lower valve member 24 has connected to it a guide rod 27 extending downwardly into a guide opening 28 of a bridge-like guide member 29 secured to a closure member 30 for the opening 16. The bridge member 29 extends upwardly from the closure member 30 into the opening 16. This closure member 30 is secured at 31 to the valve body 10. By detaching this closure member from the body 10 access is afforded through the opening 16 to the valve member 24. Access to valve member 23 is obtained through hand hole openings 51' on the sides of body member 10 for the purpose of disconnecting it from the valve stem 26. The two valve members 23 and 24 are cooperable with the valve seats in a manner well known to those familiar with the ordinary type of pressure reducing valve, such as that used at the present time in connection with gas mains. The details of the construction of the valve members and the connection therewith are claimed in the co-pending application of Mr. Jacob C. Groble, Serial No. 109,018, filed May 14, 1926.

The vertical stem 26 extends through an opening 32 in a guide plate 33 disposed directly above opening 15 and serving to separate the pressure chamber 17 from the opening 15. This plate is held in place on a shoulder 34 formed in the portion of the body 10 defining opening 15. The lower end of the vertical tubular extension 18 engages the peripheral edge of the plate 33 and serves to maintain the plate on the shoulder 34. The upper end of rod 26 is anchored to a diaphragm 35 secured to the top of the wall defining chamber 17 by means of the peripheral flange 37 of a closure cap 36. The peripheral edge of the diaphragm 35 is disposed between the flange 37 of the cap 36 and the flange 38 formed on the upper end of the tubular extension 18.

Secured to the top of the diaphragm 35 and disposed in alignment with rod 26 is a pin 40 which has formed integral with its upper end a fork 41 pivotally attached at 42 to an intermediate portion of lever 43. One end of lever 43 is pivotally attached at 44 to a link 45, which is in turn pivotally attached at 46 to an ear 47 connected to cap 36. Slidably mounted on an intermediate portion of the lever 43 is a weight 48. Pivotally attached to the other end of lever 43 is a yoke 49, which is connected to the upper end of a rod 50, the lower end of which is secured to a diaphragm 51 mounted between two connected cup-shaped members 53 and 54. The lowermost cup member 54 defines a pressure chamber 55, which is disposed in communication with the interior of the low pressure main 13 through the means of a connection 56 including a manually operable hand valve 57 of conventional construction. Secured to an intermediate portion of the rod 50 is a projection 58 cooperable with a lateral extension 59 on a weight 60, the purpose of which will be more fully explained hereinafter. The lower end of the weight 60 has secured to it a yoke 61 pivotally attached to an ear 62 secured to a pipe T 63. The pipe T 63 is connected to the upper end of a vertical pipe 64, the lower end of which is threaded into the wall of the low pressure main 13. The T is also connected by a horizontal pipeline 65 including a pipe union 66 to the pressure chamber 17 in the tubular extension 18. Anchored to the pipeline 65 is an upwardly extending arm 67 having formed integral with its free end a lateral extension 68 in which is threaded an adjustable screw 69. The end of the shank of this screw 69 is adapted to normally engage one edge of the substantially square weight 60 when the same is disposed in the position shown in the drawing. When the weight is in this normal position, it will have its vertical axis disposed to the left of the center line $a$—$b$. Screw 69 is adjustable whereby it is possible to maintain the vertical axis of weight 60 to the left of line $a$—$b$, even when the conduit 13 is at a slight angle to the horizontal.

Also disposed in communication with the low pressure main 13 is a vertical pipe 70, the upper end of which is disposed in communication with a pressure chamber 71 defined by a cup member 72 upon which is supported a diaphragm 86 secured thereto through the means of an upper cup member 74. Fastened to the diaphragm plate 73 is the lower end of a rod 75, the upper end of which has formed integral with it a yoke 76 pivotally connected at 77 to an intermediate portion of a lever 78. One end of the lever is pivotally attached to an end of a link 79, the other end of which is pivotally attached to an ear 80 secured to the cup member 74. The other end of the lever 78 has secured to it a plate 82 which carries an adjustable screw 83, the lower end of which is cooperable with a pin 84 secured to the weight 60. Slidably mounted upon an intermediate portion of lever 78 is a weight 85. By removing screw 83 and plate 82 it will be evident that the pressure reducing valve in body 10 can be operated by the constant control afforded by the parts connected to the diaphragm 51 independently of the diaphragm 86 and the parts associated therewith including weight 60.

The two opposite sides of the reducing valve body 10 are each provided with a closure plate 50', which functions to cover an opening 51' in the wall of the body 10. The openings 51' permit of the removal of the valve member 23 after it has been disconnected from the rod 25 comprising a part of stem 26. It will, of course, be evident that the lower end of the stem 26 is screwed into the rod 25 and hence by turning the rod 25 it is possible to disconnect it from the stem 26. This arrangement permits of the valve member 24 to be readily disconnected from the valve member 23 and removed through the opening 16.

The operation of our novel pressure regulating system is briefly as follows: The gas or other fluid entering the pressure reducing valve body 10 at the inlet side 11 passes through the valve opening defined by the seats 21 and 22 into the outlet 12 and thereafter into the low pressure main 13. Some of the fluid entering the low pressure main 13 passes upwardly through the pipelines 64 and 65 into the pressure chamber 17 and under the diaphragm 35. The pipelines 64 and 65 serve as an equalizer or bypass for the fluid from the low pressure side of the valve to the chamber 17. This bypass tends to cause the pressure in the chamber 17 to be substantially equal to that in the low pressure conduit 13, so that the diaphragm 35 will be subjected to a pressure substantially the equivalent of that of the flowing fluid in conduit 13. Other fluid in the low pressure main 13 passes through the hand or needle valve 57 into the chamber 55 under the diaphragm 51. Similarly some of this low pressure fluid also passes through the pipeline 70 into the chamber 71 under the diaphragm 86.

Now by adjusting the position of the weight 48 relative to the lever 43, it is possible to vary the pressure exerted by the lever 43 upon the diaphragm 35, thus enabling the diaphragm 35 to be set to respond to various pressures. The position of the weight 48 on lever 43 normally controls the pressure of the fluid entering the outlet 12 of the valve body 10. In other words, if the high pressure fluid entering the inlet 11 has a pressure of one hundred pounds and the weight 48 on the lever 43 is slid to such a position so as to give two pounds pressure on the low pressure or outlet side of the valve body 10, this pressure would remain constant at two pounds. It will, of course, be evident that the pressure prevailing in the low pressure conduit 13 is applied to the diaphragm 35 through the means of diaphragm 51, rod 50, and the lever 43 carrying weight 48. The operation of this particular arrangement is thought to be obvious from the drawing.

Now the pressure control arrangement above described is sufficient to take care of ordinary or normal demands for the fluid passing through the valve body 10. However, should a sudden demand take place for the fluid so that the pressure of the fluid in conduit 13 is quickly depleted due to the resulting rapid flow of fluid, it will be evident that the operation of diaphragm 51 will, through the lever 43 and its weight 48, only open the reducing valve including members 23 and 24 a sufficient extent to allow a fluid of two pounds pressure to enter the outlet side of the valve body. If it were not for the remaining part of the present control system, the operation of which we shall hereinafter describe, the system would be incapable of meeting the abnormal demand for fluid. We accomplish the desired result by automatically subjecting the diaphragm 51 to the pressure of an additional weight 60 adapted to supplement the predetermined and set action of the weight 48. We shall now proceed to describe in detail the control mechanism for throwing the weight 60 into a position wherein it is adapted to augment the downward pressure imposed upon diaphragm 51.

With the advent of a sudden drop of the pressure of the fluid in conduit 13 due to an increased demand for the fluid, the pressure prevailing in chamber 71 rapidly drops and the diaphragm 86 collapses downwardly drawing with it lever 78. The weight 85 on lever 78 is so adjusted as to enable the diaphragm 86 to move downwardly as the pressure of the fluid in chamber 71 drops below two pounds. A downward movement of lever 78 results in the screw 83 carried at its free end engaging pin 84 on the vertical weight 60 forcing the axis of the weight to the right hand side of the center line a—b, in which position it is free to gravitate to the dotted position shown in the drawing. Inasmuch as the rod 50 and its projection 58 will have already moved downwardly due to the drop of pressure in chamber 55, the projection or finger 59 secured to weight 60 will, during the gravitation of weight 60, engage the projection 58 forcing it and the rod 50 downwardly to substantially the dotted position shown in the drawing. This means that the diaphragm 35 will be subjected, through the means of lever 43, to a greater pressure on its upper side than the normal two pound pressure, thus causing the rod 26 and the valve members 23 and 24 carried thereby to be moved downwardly increasing the valve opening and augmenting the flow of fluid into the low pressure conduit 13.

Now as the pressure builds up in conduit 13 and in chamber 71, the diaphragm 86 will rise thus raising lever 78 up into its normal position. Also a further increase in pressure raises the diaphragm 51 and causes stem or rod 50 to rise, returning the weight 60 to a position wherein its vertical axis is disposed slightly to the left of the center line a—b. Obviously once the weight reaches this position it will gravitate until it engages the adjustable stud 69. This additional movement of the weight 60 permits of the finger 59 to be clear of the projection 58 on stem 50. This means that the outlet pressure of the fluid flowing through the valve body 10 will again recede to the predetermined minimum. The above described action will automatically be repeated as frequently as the demand increases and decreases, so that a substantially constant pressure can be maintained in the low pressure side of the reducing valve.

Now, of course, it is to be understood that although we have illustrated and described in detail the preferred form of our invention, the invention is not to be thus limited, but only in so far as defined by the scope and spirit of the appended claims.

We claim as our invention:

1. In combination, a low pressure main, a high pressure main, a pressure control valve connecting said mains, and means responsive to pressure connected to one of said mains for controlling the operation of said valve including a weight normally inactive and maintained with its axis positioned to one side of a given center line, and additional pressure responsive means adapted when a predetermined pressure has been reached in said last mentioned main connected thereto to cause the weight to be moved to the other side of said center line so as to cause it to become effective in increasing the range of operation of said valve.

2. In combination, a low pressure main, a high pressure main, a pressure control valve connecting said mains, and a plurality of pressure responsive devices connected to said low pressure main, one device being arranged to control the normal operation of said valve so as to maintain a substantially constant pressure in said low pressure main and another device being arranged upon an abnormal flow of fluid to act upon said former device so as to increase the range of control of said valve, said latter device including means adapted to be displaced from its normal position, whereby it is free to move into engagement with said former device, said means being adapted to be returned to its normal position by said first mentioned device.

3. In combination, a low pressure main, a high pressure main, a pressure control valve connecting said mains, and means responsive to pressure connected to one of said mains for controlling the operation of said valve including a weight normally maintained with its axis positioned to one side of a given center line, and pressure responsive means adapted when a predetermined pressure has been reached in said last mentioned main connected thereto to pivot the weight to the other side of said center line so as to cause it to become effective in increasing the range of operation of said valve, said latter means including a connection adapted to be removed when it is desired to allow said valve to operate independently of said pressure responsive means.

4. In combination, a conduit, a control valve connected to said conduit, and means connected to said conduit and operable by the fluid flow therein for controlling the operation of said valve, a normally inactive element movable independently of said means, and maintained with its axis to one side of a given center line and additional pressure responsive means adapted at predetermined times to cause said element to be moved to the other side of said center line so as to enable it to become effective in increasing the range of operation of said valve.

5. In combination, a weight control device including a lever and a weight slidable on said lever, said weight being set at a given point on the lever to cause the device to operate under the effect of a predetermined pressure, means for automatically increasing said pressure without shifting said weight including a weight normally maintained with its axis positioned to one side of a given center line and means adapted when a predetermined pressure has been reached to automatically pivot said second mentioned weight to the other side of said center line so as to enable it to act on said lever.

6. In combination, a high pressure main, a low pressure main, a pressure reducing valve interposed between and connecting said mains, pressure responsive means for controlling said valve, a pressure chamber disposed between said means and said low pressure main, a bypass positioned between said chamber and said low pressure main adapted with an increase in the fluid flow in said low pressure main to augment the flow of fluid from said chamber so as to enable the pressures in said chamber and low pressure main to be substantially equalized, and another pressure responsive means connected to said low pressure main adapted to supplement the action of said first pressure responsive means including a weight pivotally connected to said bypass and normally maintained with its axis positioned to one side of a given center line and means adapted when a predetermined pressure has been reached in the associated main to cause the weight to be moved to the other side of said center line so as to enable it to become effective in increasing the range of operation of said valve.

7. In combination, a conduit through which fluid is adapted to flow, a pressure control valve connected to said conduit, a plurality of pressure responsive devices connected to said conduit, a first device being arranged to control the normal operation of said valve so as to maintain a substantially constant pressure in said conduit and another device being arranged upon an abnormal flow of fluid to supplement the action of said first device upon said valve, and means for connecting said devices together including a lever operable by the second device and a weight normally maintained with its axis positioned to one side of a given center line and arranged to be pivoted by said lever to the other side of said center line, said weight when in said latter position being adapted to act upon said first device to increase the range of action of this first device upon said valve.

8. In combination, a low pressure main, a high pressure main, a pressure control valve connecting said mains, means responsive to pressure connected to one of said mains for controlling the operation of said valve including a weight normally maintained with its axis positioned to one side of a given center line, and pressure responsive means adapted when a predetermined pressure has been reached in said last mentioned main connected thereto to cause the weight to be moved to the other side of said center line so as to cause it to become effective in increasing the range of operation of said valve, and a stop member adapted to engage said weight when it is in its first mentioned or normal position, said stop member being adjustable whereby the axis of the weight can be maintained slightly to one side of the center line at all times when the weight is in its normal position.

9. In combination, a low pressure main, a high pressure main, a pressure control valve connecting said mains, and a plurality of pressure responsive devices connected to said low pressure main, one device being arranged to control the normal operation of said valve so as to maintain a substantially constant pressure in said low pressure main and another device being arranged upon an abnormal flow of fluid to act upon said former device so as to increase the range of control of said valve, said latter device including means adapted to be displaced from its normal position, whereby it is free to move into engagement with said former device, said means being adapted to be returned to its normal position by said first mentioned device, each of said devices including a pressure responsive diaphragm and leverage mechanism connected thereto, the leverage mechanism of said first mentioned device connecting it to the valve and the leverage mechanism of said second mentioned device being adapted to act upon said first displaceable means.

10. In combination, a low pressure main, a high pressure main, a pressure control valve connecting said mains, a plurality of pressure responsive devices connected to said low pressure main, each of said devices including a diaphragm, means including a rod and leverage mechanism connecting the diaphragm of one device to said valve, a weight normally maintained with its axis positioned to one side of a given center line, a projection connected to said rod adapted to be engaged by said weight when the weight is moved to the other side of said center line, and means connected to the diaphragm of another of said devices adapted to act upon said weight to move it to said other side of the center line, whereby it will engage said projection, said weight being returnable to its first mentioned position by said first mentioned device.

11. In a regulator of the type including a casing, a valve a stem for said valve, a diaphragm associated therewith and a weighted lever, weight means for supplementing the weight imposed on said lever, said diaphragm and lever cooperating with each other and with said valve for effecting actuation of the valve under the influence of pressure on said diaphragm, and means for applying the weight means to said lever to automatically maintain the valve in a position to effect an increased outlet pressure during peak loads.

12. In a regulator of the type including a casing, a valve therein, a pressure responsive element associated therewith and a lever for said element, means movable independently of said element for supplementing the force imposed on said lever, and means for automatically applying said supplemental means to said lever when the flow of fluid through said regulator reaches a predetermined amount so as to automatically maintain the valve in position to effect an increased outlet pressure during peak loads.

13. In a regulator of the type including a casing, a valve therein, a pressure responsive element associated therewith and a lever for said element, means for supplementing the force imposed on said lever, and means for automatically applying said supplemental means to said lever when the flow of fluid through said regulator reaches a predetermined amount so as to automatically maintain the valve in position to effect an increased outlet pressure during peak loads, said supplemental means comprising a weight arranged to be tilted by said applying means into effective cooperation with said lever.

14. In a regulator of the type including a casing, a valve therein, a pressure responsive element associated therewith and a lever for said element, means for supplementing the force imposed on said lever, and means for automatically applying said supplemental means to said lever when the flow of fluid through said regulator reaches a predetermined amount so as to automatically maintain the valve in position to effect an increased outlet pressure during peak loads, said supplemental means comprising a pivoted weight arranged to be tilted from its ineffective or normal position by said applying means into a position where it is imposed on the lever.

15. In a regulator of the type including a casing, a valve therein, a pressure responsive element associated therewith and a lever for said element, means for supplementing the force imposed on said lever, and means for automatically applying said supplemental means to said lever when the flow of fluid through said regulator reaches a predetermined amount so as to automatically maintain the valve in position to effect an increased outlet pressure during peak loads, said supplemental means comprising a pivoted weight arranged to be tilted from its ineffective or normal position by said applying means into a position where it is imposed on the lever, said applying means including a low pressure responsive element and a lever associated therewith for engaging said weight to tilt it.

In testimony whereof, we have hereunto subscribed our names at Anderson, Madison County, Indiana.

JACOB C. GROBLE.
JAMES POLLOCK.
WILLIAM C. GROBLE.